(12) United States Patent
Chuang et al.

(10) Patent No.: US 10,420,157 B2
(45) Date of Patent: Sep. 17, 2019

(54) METHOD FOR AUTHORIZATION PAIRING

(71) Applicant: TEKTRO TECHNOLOGY CORPORATION, Changhua County (TW)

(72) Inventors: Hsun-Yu Chuang, Changhua County (TW); Pao-Wen Lin, Changhua County (TW)

(73) Assignee: TEKTRO TECHNOLOGY CORPORATION, Changhua County (TW)

( * ) Notice: Subject to any disclaimer, the term of this patent is extended or adjusted under 35 U.S.C. 154(b) by 0 days.

(21) Appl. No.: 16/127,508

(22) Filed: Sep. 11, 2018

(65) Prior Publication Data
US 2019/0246437 A1    Aug. 8, 2019

(30) Foreign Application Priority Data

Feb. 2, 2018 (TW) .................. 107103757

(51) Int. Cl.
*H04W 76/11* (2018.01)
*H04W 76/14* (2018.01)
*B62M 9/122* (2010.01)
*B62M 25/08* (2006.01)
*B62M 9/132* (2010.01)

(52) U.S. Cl.
CPC .......... *H04W 76/11* (2018.02); *B62M 9/122* (2013.01); *B62M 9/132* (2013.01); *B62M 25/08* (2013.01); *H04W 76/14* (2018.02)

(58) Field of Classification Search
CPC ...... H04W 76/11; H04W 76/14; B62M 9/122; B62M 9/132; B62M 25/08
See application file for complete search history.

(56) References Cited

U.S. PATENT DOCUMENTS

| | | | |
|---|---|---|---|
| 2006/0281409 A1* | 12/2006 | Levien | H04W 4/08 455/41.2 |
| 2010/0235429 A1* | 9/2010 | Simonen | H04L 63/0492 709/203 |
| 2011/0066850 A1* | 3/2011 | Ekberg | H04L 63/0209 713/162 |
| 2012/0221464 A1* | 8/2012 | Pasquero | H04L 63/0492 705/39 |
| 2012/0257561 A1* | 10/2012 | Redding | H04L 12/1827 370/312 |

(Continued)

*Primary Examiner* — David Bilodeau
(74) *Attorney, Agent, or Firm* — Locke Lord LLP; Tim Tingkang Xia, Esq.

(57) ABSTRACT

An authorization pairing method is applicable to an electronic derailleur system for a bicycle, comprising: an authorization device broadcasting a authorization signal, and the first communication device and the second communication device respectively performing the first scanning process and the second scanning process, and each scanning process determine whether the authorization signal is obtained, the first communication device determines whether an identification code is obtained after obtaining the authorization signal, and the second communication device sends an identification code representing the identity after obtaining the authorization signal, and the first communication device obtains the identification code and establishes an authorization pairing with the second communication device.

16 Claims, 7 Drawing Sheets

(56) References Cited

U.S. PATENT DOCUMENTS

| | | | | |
|---|---|---|---|---|
| 2014/0102237 A1* | 4/2014 | Jordan | .................. | B62K 23/02 |
| | | | | 74/473.12 |
| 2015/0289124 A1* | 10/2015 | Palin | ..................... | H04W 8/005 |
| | | | | 455/41.2 |
| 2015/0350865 A1* | 12/2015 | Conn | ................... | H04W 8/005 |
| | | | | 455/41.2 |
| 2016/0174021 A1* | 6/2016 | Lim | ..................... | H04W 8/005 |
| | | | | 370/310 |
| 2018/0007499 A1* | 1/2018 | Lee | ........................ | H04W 4/00 |
| 2018/0288599 A1* | 10/2018 | Zhao | .................. | G08B 27/001 |

\* cited by examiner

METHOD FOR AUTHORIZATION PAIRING

CROSS-REFERENCE TO RELATED APPLICATIONS

This non-provisional application claims priority under 35 U.S.C. § 119(a) on Patent Application No(s). 107103757 filed in Taiwan, R.O.C. on Feb. 2, 2018, the entire contents of which are hereby incorporated by reference.

BACKGROUND

Technical Field

The present disclosure is related to a pairing method for a communication device, and more particularly to a pairing method for a communication device of a bicycle electronic derailleur system.

Related Art

Due to the advancement of wireless communication technology, in the electronic derailleur system of bicycles, it is a popular trend to connect the left and right shifting handles and the front and rear shifters by means of wireless communication. Before the rider rides, the components of the aforementioned electronic derailleur system must be paired. For example, a common form of pairing is that the left shifting handle is paired with the front derailleur and the right shifting handle is paired with the rear derailleur. The pairing process means storing the necessary information associated with the two electronic derailleur system components on the premise of establishing a communication connection between the two electronic derailleur system components, so that the rider can control the shifting handle when riding the bicycle, sending the speed adjusting signal to the front and rear derailleurs.

The common pairing methods of electronic derailleur system components can be roughly divided into two according to whether or not there are third-party pairing devices. For the pairing method of "no third-party pairing device", for example, the user presses the left shifting handle and the pairing button on the front derailleur respectively, so that the two establish a communication connection and exchange the information required for the pairing to complete the pairing. Another type of "with a third-party pairing device" is as follows: the user obtains the pairing information of the left shifting handle through the third-party pairing device, and then sends the pairing information to the front derailleur through the third-party pairing device, and the front derailleur establishes a communication connection with the left shifting handle according to the pairing information received and completes the pairing process. From the perspective of security and anti-theft, the "connection method without a third-party pairing device" has a simple process and there is no restriction on the users; in other words, anyone can steal all or part of the electronic derailleur system and perform the pairing process easily, and then to use the paired components. In contrast, the "with a third-party pairing device" pairing method can achieve the protection effect on the bicycle electronic derailleur system through the third-party pairing device; in other words, only the person holding the third-party pairing device can perform the pairing connection, then to use the paired components. However, the process of pairing with third-party pairing devices today is too complex. In practice, often after the electronic derailleur system restarts the power supply, or when replacing one of the components of the electronic derailleur system, the user needs to re-execute the aforementioned pairing process, causing inconvenience.

SUMMARY

In view of this, the present disclosure proposes a method for authorizing pairing, which enables the electronic derailleur system components to be automatically paired through the authorization device, which simplifies the pairing process and reduces number of times the pairing has to be processed again while satisfying the anti-theft demand of the electronic derailleur system.

An authorization pairing method according to an embodiment of the present disclosure is applicable to an electronic derailleur system for a bicycle. The electronic derailleur system includes a plurality of communication devices and an authorization device, and the method includes: broadcasting an authorization signal by an authorization device. The first scanning process is done by the first communication device among the plurality of communication devices to determine whether the authorization signal is obtained; and the second scanning process is done by the second communication device among the plurality of communication devices to determine whether the authorization signal is obtained; after the first communication device receives the authorization signal, the first communication device continues to perform the first scanning process to determine whether an identification code is obtained; after the second communication device receives the authorization signal, the second communication device sends an identification code, the identification code is representative of the second communication device; and after the first communication device obtains the identification code, the first communication device stores the identification code and completes an authorized pairing process with the second communication device.

With the above technique, the authorization pairing method disclosed by the present disclosure notifies the two components of the electronic derailleur system to exchange pairing information by the authorization signal sent by the authorization device, thereby establishing an authorized pairing connection. For the user, the pairing process can be completed only by operating the authorization device itself, simplifying the complex pairing steps of the traditional pairing device, and improving the convenience while preserving the security and anti-theft function of the electronic derailleur system.

The above description of the disclosure and the following description of the embodiments of the present disclosure are intended to illustrate and explain the spirit and principles of the invention, and can give a further explain of the present disclosure.

BRIEF DESCRIPTION OF THE DRAWINGS

The present disclosure will become more fully understood from the detailed description given here in below and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
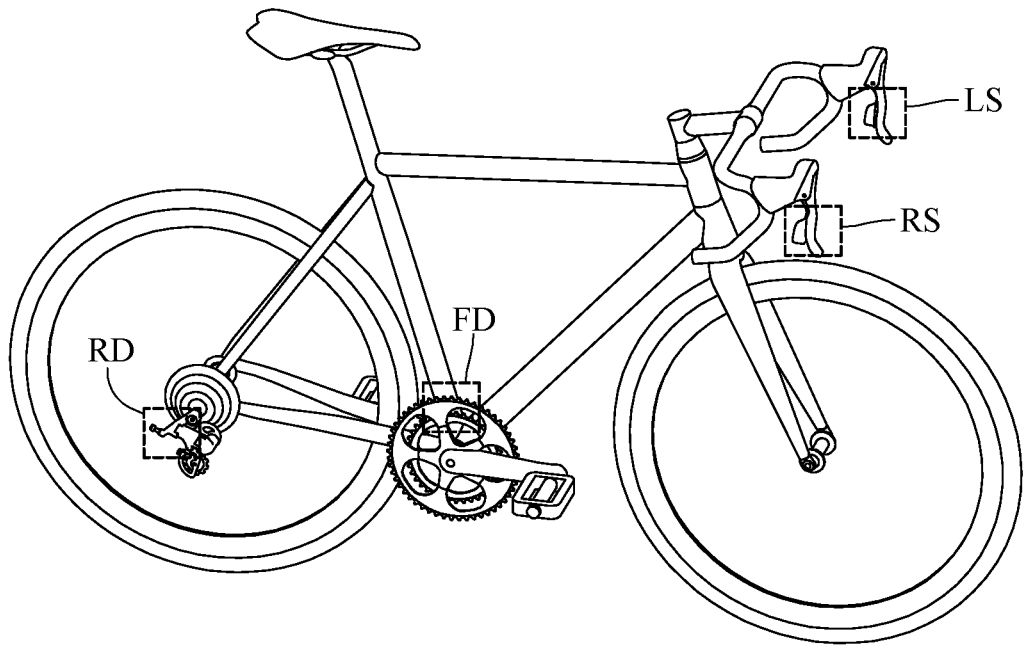
FIG. 1 is a schematic view of the position of a bicycle electronic derailleur system component.

Please refer to FIG. 1, which is a schematic diagram showing the installation position of the bicycle electronic derailleur system. In general, electronic derailleur system components that need to be paired include a left shifting handle at the LS position, a right shifting handle at the RS position, a front derailleur at the FD position, and a rear derailleur at the RD position.

Figure 2:
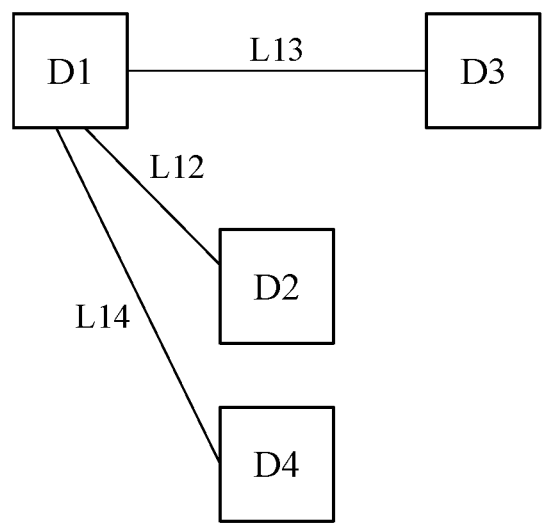
FIG. 2 is a schematic diagram of the pairing connection of the component a bicycle electronic derailleur system.

Please refer to FIG. 1 and FIG. 2 together. FIG. 2 is a schematic diagram showing the connection of authorization pairings of the paired electronic derailleur system components from the direction of the bicycle. The first communication device D1 installed at the LS position and the second communication device D2 installed at the FD position have a pairing connection L12, and the third communication device D3 installed at the RS position has a pairing connection L13, and The fourth communication device D4 provided at the RD position has a pairing connection L14. In practice, the pairing lines L12, L13 and L14 use the same wireless communication standard, such as: ANT+, Bluetooth, Bluetooth Low Energy, ZigBee, Wireless Area Network Technology, Near-Field Communication (NFC) or wireless communication standards designed by the manufacturer. The communication devices D1~D4 are electrically connected to the electronic derailleur system components at the respective positions, so that the control devices (not shown) in the electronic derailleur system components can send or receive wireless signals through the communication devices D1~D4. In addition, the first communication device D1 can be selectively installed in one of the left shifting handle or the right shifting handle, and the remaining communication devices D2~D4 can be selectively installed in a location separately from the occupied position of the first communication device D1.

Referring to FIG. 2, according to the method in which the paired communication devices D1~D4 send wireless signals, an example is illustrated as follows: the wireless signal generated by the left shifting handle is sent by the first communication device D1 through the pairing connection L12 to the second communication device D2. The wireless signal sent by the right shifting handle is sent by the third communication device D3 to the first communication device D1 through the pairing connection L13, and then sent by the first communication device D1 to the fourth communication device D4 through the pairing connection L14. In other words, the first communication device D1 can directly send and receive wireless signals and can also transfer wireless signals, and the other three communication devices D2 to D4 are only responsible for sending and receiving wireless signals. In order to enable the bicycle electronic derailleur system component to achieve the above-mentioned wireless signal transmission mode after the pairing is completed, the authorization pairing method disclosed in the present disclosure will be divided into two implementation aspects in the first embodiment, and the first embodiment is to replace one or more of the second to fourth communication devices D2 to D4, and the second embodiment is to replace the first communication device D1.

When the second communication device D2 is removed from the communication range or the second communication device D2 is powered off, the pairing connection L12 will be interrupted. On the other hand, since the first communication device D1 continuously detects the current connection status of the paired connections (L12, L13, and L14) after establishing the pairing connection with the communication devices D2 to D4, when D1 detects that the current connection state lacks the pairing connection L12, the first communication device D1 will perform the first scanning process. In addition, the newly added fifth communication device D5 will perform the second scanning process if the pairing connection cannot be established directly with the first communication device D1 after the power of the fifth communication device D5 is turned on.

Figure 3:
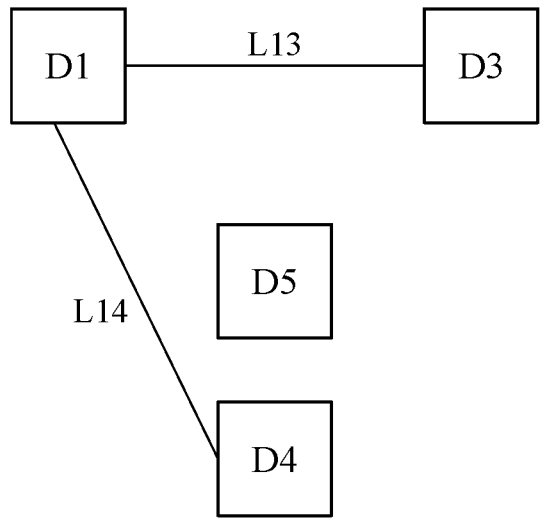
FIG. 3 is a schematic diagram of an authorization pairing method according to a first embodiment of the present disclosure.
Figure 3A:
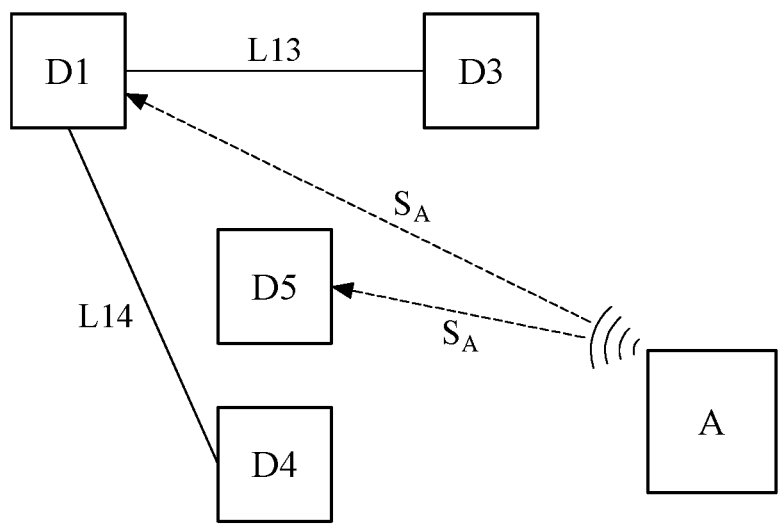
FIG. 3A is a schematic diagram of an authorization pairing method according to a first type of the first embodiment of the present disclosure.
Figure 3B:
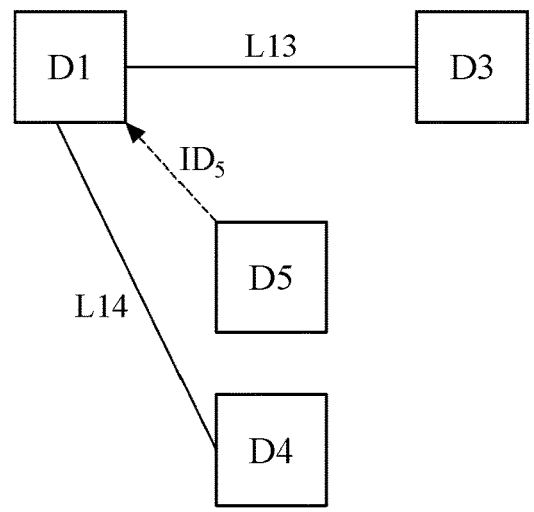
FIG. 3B is a schematic diagram of an authorization pairing method according to a first type of the first embodiment of the present disclosure.
Figure 3C:
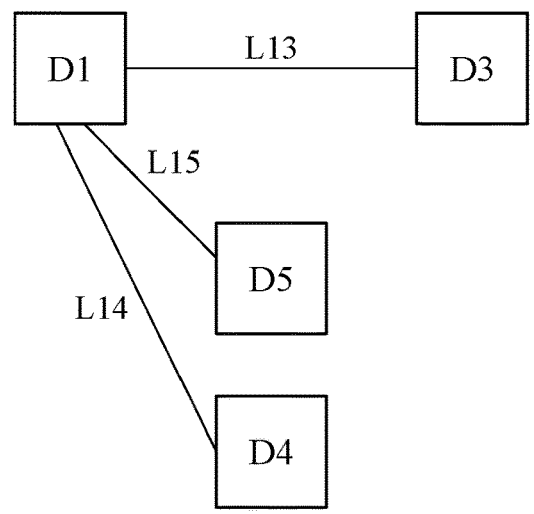
FIG. 3C is a schematic diagram of an authorization pairing method according to a first type of the first embodiment of the present disclosure.

Please refer to FIG. 3A, which is a schematic diagram of the authorization device A broadcasting the authorization signal $S_A$. In practice, the authorization device A is a signal transceiver capable of executing one or more of the foregoing wireless communication standards, and may also be a smart mobile phone device. In detail, FIG. 3A shows that the user operates the authorization device A to broadcast an authorization signal $S_A$. The second scanning process done by the fifth communication device D5 is configured to receive the wireless signal and determine whether the received wireless signal is the authorization signal $S_A$; if not, the fifth communication device D5 continues to perform the second scanning process; if yes, the fifth communication device D5 sends an identification code $ID_5$ for representing itself, as shown in FIG. 3B. The first scanning process done by the first communication device D1 is also used to receive the wireless signal and determine the type of the received wireless signal; if the first communication device D1 has never received the authorization signal $S_A$, the first communication device D1 continues to perform the first scanning process; if the first communication device D1 receives the authorization signal $S_A$, the first communication device D1 continues to perform the first scanning process to determine whether the identification code is obtained, and when the first communication device D1 receives the identification of the fifth communication device $ID_5$, the first communication device D1 stores the identification code $ID_5$ and establishes a pairing connection L15 with the fifth communication device D5 according to the identification code $ID_5$, as shown in FIG. 3C.

The above-described pairing connection method can be applied to the second, third or fourth communication devices D2 to D4, for example, by re-pairing the third communication device D3 as following: The user operates the authorization device A to send the authorization signal $S_A$. The third communication device D3 detects that its current connection status is "no pairing connection", so the third communication device D3 performs a third scanning process to determine whether the authorization signal $S_A$ is obtained; and after the third communication device D3 obtains the authorization signal $S_A$, the third communication device D3 sends an identification code $ID_3$ to represent itself. After detecting that the original pairing connection L13 is interrupted, the first communication device D1 performs the first scanning process to wait for the authorization signal $S_A$; after the first communication device D1 obtains the authorization signal $S_A$, the first communication device D1 continues to perform the first scanning process to determine whether the identification code $ID_3$ of the third communication device D3 is obtained; after the first communication device D1 obtains the identification code $ID_3$ of the third communication device D3, the first communication device D1 stores the identification code $ID_3$ and the third communication device D3 establishes a pairing connection L13, and completes the pairing process of the first communication device D1 and the third communication device D3.

In practice, electronic derailleur system components with communication devices D1 to D4 are typically used in sets. Before leaving the factory, the first communication device D1 can pre-write the identification codes $ID_2 \sim ID_4$ of the remaining three communication devices D2~D4, and the second, third and fourth communication devices D2~D4 can also have the identification code of the communication device D1 be written in advance. Therefore, after the first time power-on enabling of the electronic transmission system component is done, the communication device D1 will broadcast its own identification code $ID_1$ when detecting that it does not have any pairing connection L12~L14, and the other three communication devices D2 to D4 confirms that the identification code $ID_1$ belongs to the pre-paired communication device D1, and therefore also broadcast its own identification code $ID_2 \sim ID_4$, waiting for the first communication device D1 receives the identification codes $ID_2 \sim ID_4$ and confirms the communication devices D2~D4 that are pre-paired, the first communication device D1 is connected to the second, third and fourth communication devices D2~D4 to establish pairing L12~L14 respectively, and the process can be completed automatically, thus simplifying the inconvenience that the user needs to manually send the pairing information by the third party device in the conventional pairing mode. The above pairing process considers the initial pairing performed by the driver after the initial purchase of the electronic derailleur system, so that the step of sending the authorization signal $S_A$ by the authorized device A can be omitted, and only using the identification code $ID_1$ stored in the communication devices D1 to D4 before leaving the factory for authorization pairing. However, it is also practical to design the communication devices D1 to D4 to send the own identification codes $ID_1$ to $ID_4$ after receiving the authorization signal $S_A$, which is not limited by the present disclosure.

Figure 4:
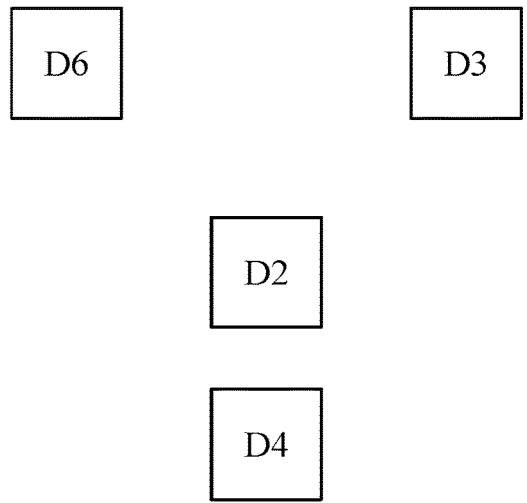
FIG. 4 is a schematic diagram of an authorization pairing method according to a second type of the first embodiment of the present disclosure.

According to the authorization pairing method disclosed in the second type of the first embodiment of the present disclosure, please refer to FIG. 2 and FIG. 4 together, which means that the user replaces the first communication device D1 with the sixth communication device D6 (for example, the first communication device D1 must be replaced because the first communication device D1 is broken). The hardware structure of the sixth communication device D6 and the first communication device D1 are basically the same. When the first communication device D1 is removed from the communication range or the first communication device D1 is powered off, the pairing lines L12, L13 and L14 are all interrupted. The sixth communication device D6 for replacing the first communication device D1 detects that the current connection status is "no pairing connection" after the power is turned on, and does not receive the identification code of the preset pairing communication device to automatically establish the pairing. So the sixth communication device D6 performs the first scanning process to determine whether the authorization signal $S_A$ is obtained. Similarly, since the second to fourth communication devices D2 to D4 do not have any paired connections, respectively, the second to fourth scanning process are respectively processed to determine whether or not the authorization signal $S_A$ is obtained.

Figure 4A:
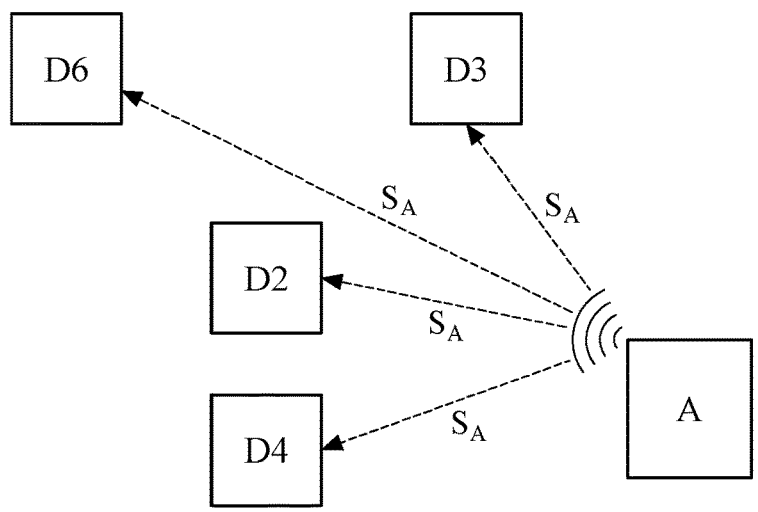
FIG. 4A is a schematic diagram of an authorization pairing method according to a second type of the first embodiment of the present disclosure.
Figure 4B:
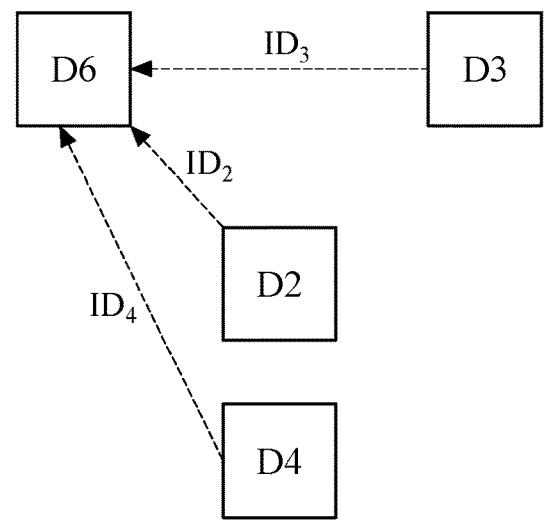
FIG. 4B is a schematic diagram of an authorization pairing method according to a second type of the first embodiment of the present disclosure.
Figure 4C:
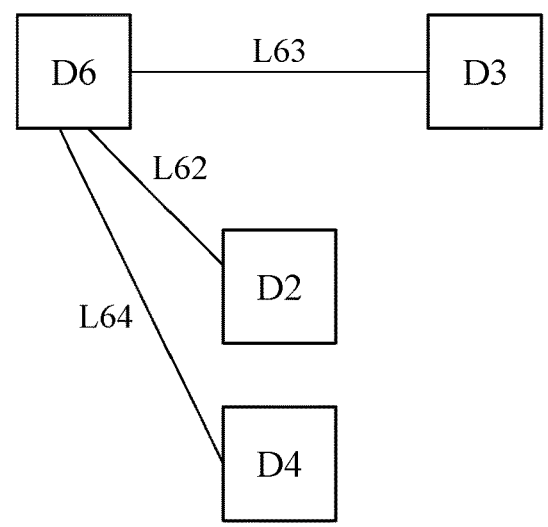
FIG. 4C is a schematic diagram of an authorization pairing method according to a second type of the first embodiment of the present disclosure.

Please refer to FIG. 4A, which is a schematic diagram of the authorization device A broadcasting the authorization signal $S_A$. In detail, the user operates the authorization device A to send the authorization signal $S_A$. Referring to FIG. 4B, after the second to fourth communication devices D2 to D4 each receive the authorization signal $S_A$, they respectively send their own identification codes $ID_2$ to $ID_4$. On the other hand, the sixth communication device D6 performs the first scanning process to determine whether the received wireless signal is the authorization signal $S_A$; if not, the sixth communication device D6 repeatedly performs the foregoing determining step until the sixth communication device D6 confirms received the authorization signal $S_A$, then the first scanning process determines whether the received wireless signal contains the identification code $ID_2$, $ID_3$ or $ID_4$. Each time after receiving the identification code $ID_2$, $ID_3$ or $ID_4$, the sixth communication device D6 stores the identification code $ID_2$, $ID_3$ or $ID_4$, and establishing a pairing connection L62, L63 or L64 with the communication device D2, D3 or D4 with the devices sending the identification code $ID_2$, $ID_3$ or $ID_4$; after the sixth communication device D6 establishes all the necessary pairing lines L62, L63 and L64 (the present disclosure does not restrict the number of pairing connections), that is, the pairing of all electronic derailleur system components is completed, as shown in FIG. 4C.

According to the authorization pairing method introduced in the first embodiment, the user only needs to simply operate the authorization device A to send the authorization signal $S_A$ to complete the pairing of all communication devices, thereby effectively reducing the complexity of while pairing the electronic transmission system components. These steps is to ensure the security in the pairing process by the trusted authorization device A. The second embodiment of the present disclosure will be further described below, which adds a "reconfirmation procedure" according to the first embodiment, and the "reconfirmation procedure" can be applied to the two disclosure in the first embodiment. In the following description, the "reconfirmation procedure" is added as a second embodiment based on the first type of the first embodiment, and the general knowledge of the technical field of the present disclosure should know how to apply "reconfirmation procedure" to the second type of the first embodiment. In addition, it must be explained in advance that the second embodiment is divided into two disclosures according to the timing of performing the "reconfirmation procedure" and by the communication device: the first disclosure is that the first communication device D1 performs the "reconfirmation procedure" after obtaining the identification code $ID_5$. The second disclosure is that the fifth communication device D5 performs the "reconfirmation procedure" before sending the identification code $ID_5$.

Figure 5A:
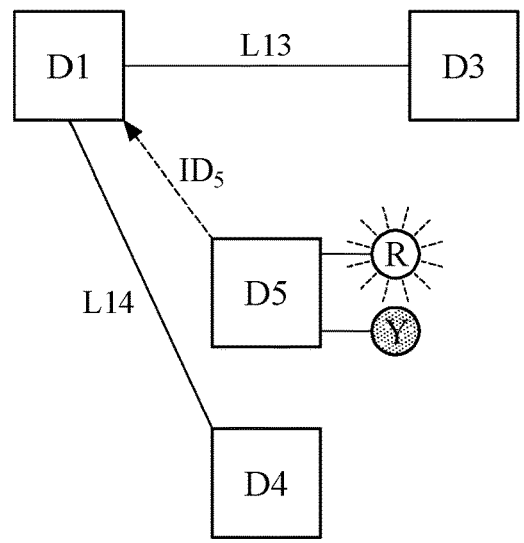
FIG. 5A is a schematic diagram of an authorization pairing method according to a second embodiment of the present disclosure.
Figure 5B:
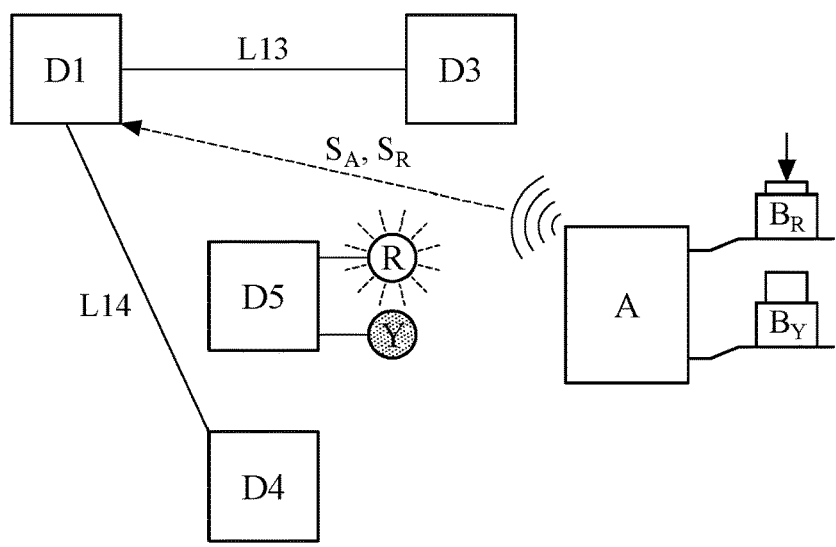
FIG. 5B is a schematic diagram of an authorization pairing method according to a second embodiment of the present disclosure.
Figure 5C:
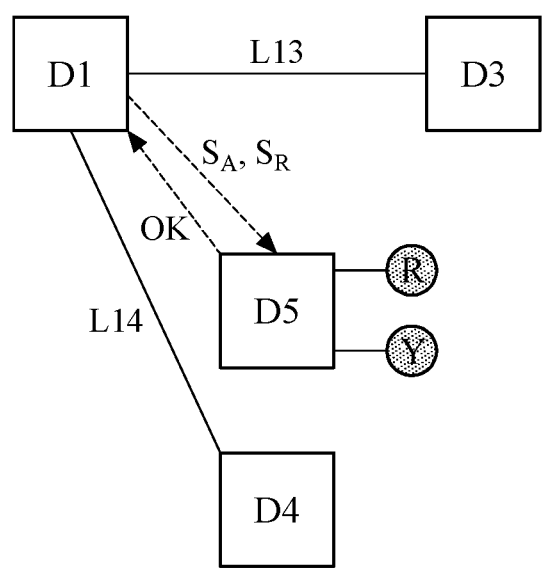
FIG. 5C is a schematic diagram of an authorization pairing method according to a second embodiment of the present disclosure.

A first type of the second embodiment will be described below. Referring to FIG. 3A, the fifth communication device D5 obtains the authorization signal $S_A$. The previous steps are the same as those in the first type of the first embodiment, and are not repeated here. Referring to FIG. 5A, after the fifth communication device D5 obtains the authorization signal $S_A$, the fifth communication device D5 not only generates the identification code $ID_5$ of its own, but also a generates a verification information in addition. The LED lamp R that emits red light and the LED lamp Y that does not emit yellow light, as shown in FIG. 5A. In practice, the fifth communication device D5 is provided with a display component or a light-emitting component, such as an LED lamp, a seven-segment display, etc., and the present disclosure does not limit the hardware of the display component or the light-emitting component. The display component is used to generate the aforementioned verification information, for example, an LED light emitting a specific color light (a plurality of LED lights having different color lights, such as the red LED light R and the yellow LED light Y of FIG. 5A, but may also be a single A LED lamp that emits multiple colors of light, or a seven-segment display that presents a specific number). The verification information is generated in a random manner, that is, the verification information generated currently is not the same as the previous one. For example, the verification information generated currently is the LED light R emitting red light and the LED light Y not emitting yellow light. The verification information generated in the second time is an LED light Y emitting yellow light and an LED light R not emitting red light. The verification information is used for the user to notice and accordingly operate the authorized device A to send a verification signal, and the verification signal sent at this time must be associated with the aforementioned verification information to complete the pairing. On the other hand, the authorizing device A has an input interface for generating an input message, and the input interface is, for example, a button. The present disclosure does not limit the hardware structure of the input interface. Referring to FIG. 5B, when the verification information is an LED light R emitting red light and an LED light Y not emitting yellow light, the user presses the corresponding red button $B_R$ on the authorized device A and does not press the yellow button $B_Y$, thereby generating a correspondence verification signal $S_R$. The authorizing device A broadcasts the verification signal $S_R$ together with another authorization signal $S_A$, as shown in FIG. 5B. Since the first communication device D1 has received the identification code $ID_5$ automatically sent by the fifth communication device D5 at the time in FIG. 5A, in the aforementioned first embodiment, the first communication device D1 can store the identification code $ID_5$ at this time. The connection of the authorization pairing is completed. In the first type of the second embodiment, the first communication device D1 must continue to perform the first scanning process to obtain another authorization signal $S_A$ including the verification signal $S_R$, and then the first communication device D1 sends another authorization signal $S_A$ including the verification signal $S_R$ to the fifth communication device D5, as shown in FIG. 5C. The fifth communication device D5 checks whether the verification signal $S_R$ included in the other authorization signal $S_A$ meets the verification information generated by itself (the LED light R emitting red light and the LED light Y emitting yellow light). If the two information matches, then the fifth communication device D5 send back a confirmation signal OK to the first communication device D1, as shown in FIG. 5C. After the first communication device D1 obtains the confirmation signal OK, the identification code $ID_5$ can be stored to complete the connection of the authorized pairing L15, and the connection status after the completion of the pairing is as shown in FIG. 3C.

A second type of the second embodiment will be described below, which puts the "reconfirmation procedure" before the fifth communication device D5 sends the identification code $ID_5$ representing itself In detail, after the power of the fifth communication device D5 is turned on, if the newly added fifth communication device D5 cannot directly establish a pairing with the first communication device D1, then it would perform a second scanning process and simultaneously generates a verification information. The verification information is, for example, "LED light R emitting red light and LED light Y not emitting yellow light". Before the user triggers the authorization device A to send the authorization signal $S_A$, the user must generate an input message on the input interface of the authorized device A, for example, pressing the red button. The authorization device A converts the input message generated by pressing the red button into a verification signal $S_R$, and the verification signal $S_R$ can correspond to the foregoing verification information, and then the authorization device A broadcasts the verification signal $S_R$ together with the authorization signal $S_A$. After determining that the received signal is the authorization signal $S_A$, the second scanning process further detects whether the verification signal $S_R$ is included; if so, the fifth communication device D5 can send the identification code $ID_5$ representing the identity of itself, otherwise the fifth communication device D5 ignores this authorization signal $S_A$.

According to the authorizing pairing method with the "reconfirmation procedure" introduced in the two type of the second embodiment, since before the communication device D1 or D5 stores the identification code or sends the identification code, the user needs use the authorization device A to confirm the verification information randomly generated on the fifth communication device to proceed the pairing process, so that it can be ensured that the pairing process of the first communication device D1 and the fifth communication device D5 is not caused by the signal sent by the communication device on other authorized devices or on other bicycles which would cause pairing errors.

In order to simplify the steps of the user operating the authorization device A, the first type of the second embodiment can also be implemented in the following manner: the authorization signal $S_A$ is obtained by the first communication device D1 or the fifth communication device D5. Previously, the authorizing device A broadcasts an identification information, which is the device identification code $ID_A$ of the authorized device A. In practice, the authorization device A may send the identification information together with the authorization signal $S_A$, or may separately send the identification information and the authorization signal $S_A$, which is not limited by the present disclosure. If they are sent together, the first communication device D1 and the fifth communication device D5 respectively receive and store the authorization signal $S_A$ containing the identification information $ID_A$. When the fifth communication device D5 sends the identification code $ID_5$, the identification information $ID_A$ is also sent together; after receiving the identification code $ID_5$ and the identification information $ID_A$, the first communication device D1 compares whether the received identification information $ID_A$ is the same with the identification information $ID_A$ stored in the first communication device. If the two are the same, the first communication device D1 stores the identification code $ID_5$ to complete the authorization pairing, otherwise the first communication device D1 ignores the identification code $ID_5$ received this time. In other words, in this embodiment, the condition that the first communication device D1 determines whether to store the identification code $ID_5$ is changed from the verification signal manually sent to the identification code $ID_A$ of the authorization device A that is automatically sent, so that the steps of the user's operation on the authorization device A can be reduced while the pairing error can still be avoided.

According to various type of the second embodiment, it can be ensured that the first communication device D1 and the fifth communication device D5 would not be disturbed by the authorization signal $S_A$ sent by the plurality of authorized devices A at the same time causing the identification code being sent out erroneously, and result in having a pairing connection error occurred in the components of the electronic derailleur system. In addition, in order to avoid unexpected human factors causing pairing connection errors, the aforementioned first to sixth communication devices D1 to D6 have an erasing procedure for deleting the identification code stored due to the wrong pairing connection, so that the communication device D1 to D6 restores the state before pairing. The erasing procedure is triggered, for example, by pressing a reset button on the communication devices D1 to D6, which is not limited by the present disclosure.

In addition, it must be added that when the first communication device D1 starts to perform the first scanning process, the first communication device D1 further includes a timer for accumulating a scan time. When the scan time exceeds a preset waiting time, the first communication device D1 stops performing the first scanning process. The timing mechanism can also be applied to the second to fourth communication devices D2 to D4 by setting the maximum scan time that can be tolerated by the second to fourth scanning processes to avoid unnecessary power wasting caused by long-time scanning.

In summary, the authorization pairing method disclosed in the embodiment of the present disclosure broadcasts an authorization signal through an authorization device, so that the communication devices installed in the electronic transmission system component respectively broadcast the identification code representing the identity of itself by the wireless signal, or letting a communication device to receive an identification code from another communication device. Thereby, a pairing is established between the two communication devices that broadcasts and receives the identification code, and the same steps are repeated to complete the pairing between all the communication devices. According to the pairing information exchange process disclosed in the embodiment of the present disclosure, most of the steps are implemented by each communication device, and the user only needs to send the authorization signal by the authorized device to complete the pairing process of all the communication devices. Compared with the conventional pairing, in this way, the authorization pairing method in the present disclosure is undoubtedly simpler, and the security mechanism and the anti-theft property of the paired connection between the electronic transmission system components are also enhanced through the verification mechanism between the authorization device and the communication device.

What is claimed is:

1. An authorization pairing method for an electronic derailleur system on a bicycle, with the electronic derailleur system comprising a plurality of communication devices and an authorization device, the method comprising:
   broadcasting an authorization signal by the authorization device;
   performing a first scanning process by a first communication device of the plurality of communication devices to determine whether the authorization signal is obtained;
   performing a second scanning process by a second communication device of the plurality of communication devices to determine whether the authorization signal is obtained;
   performing the first scanning process by the first communication device continuously after the first communication device obtains the authorization signal for determining whether an identification code is obtained;
   sending the identification code by the second communication device after the second communication device obtains the authorization signal, wherein the identification code represents the second communication device; and
   storing the identification code by the first communication device after the first communication device obtains the identification code, to complete an authorization pairing with the second communication device.

2. The authorization pairing method of claim 1, wherein before the first communication device or the second communication device obtaining the authorization signal, the method further comprises:
   broadcasting an identification information by the authorization device, wherein the identification information represents the authorization device;
   receiving and storing the identification information by the first communication device;
   receiving and storing the identification information by the second communication device;
   sending the identification information along with the identification code by the second communication device; and
   determining whether to store the identification code according to the identification information by the first communication device after the first communication device obtains the identification code and the identification information.

3. The authorization pairing method of claim 1, wherein the authorization device has an input interface and the second communication device has a display component, and performing the second scanning process by the second communication device further comprises:
   generating a verification information through the display component by the second communication device;
   generating a verification signal by the authorization device according to an input signal from the input interface and the verification information, and the verification signal corresponds to the verification information;

sending the verification signal along with the authorization signal by the authorization device; and sending the identification code by the second communication device when the verification signal corresponds to the verification information after the second communication device obtains the authorization signal and the verification signal, otherwise continuously performing the second scanning process by the second communication device.

4. The authorization pairing method of claim 1, wherein the authorization device has an input interface and the second communication device has a display component, after the second communication device obtaining the authorization signal, the method further comprises:

generating a verification information by the second communication device with the display component;

generating a verification signal by the authorization device according to an input signal from the input interface and the verification information, and the verification signal corresponds to the verification information;

sending another authorization signal by the authorization device after the first communication device obtains the identification code and before the first communication device and the second communication device complete the authorization pairing;

receiving the another authorization signal by the first communication device and sending the another authorization signal to the second communication device;

receiving the another authorization signal and sending a confirmation signal back by the second communication device; and completing the authorization pairing of the first communication device and the second communication device after the first communication device receives the confirmation signal.

5. The authorization pairing method of claim 4, wherein the display component is a light-emitting component capable of emitting a plurality of different color lights or a plurality of light-emitting components capable of emitting a plurality of different color lights, and the verification information is at least one light signal.

6. The authorization pairing method of claim 4, wherein before sending back the confirmation signal by the second communication device, the method further comprises:

confirming whether the another authorization signal comprises the verification signal by the second communication device; and sending a confirmation signal by the second communication device when the verification signal corresponds to the verification information.

7. The authorization pairing method of claim 1, after completing the authorization pairing by the first communication device and the second communication device, the method further comprises: performing a cancellation process by the first communication device, wherein the cancellation process is used to delete the identification code stored in the first communication device.

8. The authorization pairing method of claim 1 further comprises:

storing another identification code of a third communication device by the first communication device before the first communication device performs the first scanning process to determine whether the authorization signal is obtained.

9. The authorization pairing method of claim 1 further comprises:

performing a third scanning process by a third communication device of the communication devices to determine whether the authorization signal is obtained;

sending another identification code by the third communication device after the third communication device obtains the authorization signal;

performing the first scanning process by the first communication device continuously after the first communication device obtains the authorization signal for determining whether an identification code is obtained;

storing the another identification code by the first communication device and completing an another authorized pairing with the third communication device after the first communication device obtains the another identification code.

10. The authorization pairing method of claim 1, wherein the authorization device is a smart phone.

11. The authorization pairing method of claim 1, wherein performing the first scanning process by the first communication device to determine whether the authorization signal is obtained comprises: accumulating a scan time by the first communication device when the first communication device starts to perform the first scanning process, and terminating the first scanning process by the first communication device when the scan time exceeds a waiting time.

12. The authorization pairing method of claim 1, wherein performing the second scanning process by the second communication device to determine whether the authorization signal is obtained comprises: accumulating a scan time by the second communication device when the second communication device starts to perform the second scanning process, and terminating the second scanning process by the second communication device when the scan time exceeds a waiting time.

13. The authorization pairing method of claim 1, wherein before the first communication device performs the first scanning process to determine whether the authorization signal is obtained, the method further comprises: detecting a current connection state by the first communication device.

14. The authorization pairing method of claim 1, wherein before the second communication device performing the second scanning process, the method further comprises: detecting a current connection state by the second communication device.

15. The authorization pairing method of claim 1, wherein the first communication device is configured to be mounted on a left shifting handle or a right shifting handle.

16. The authorization pairing method according to claim 1, wherein the second communication device is configured to be mounted on a left shifting handle, a right shifting handle, a front derailleur or a rear derailleur.

* * * * *